United States Patent
Crisan et al.

(10) Patent No.: US 10,002,006 B2
(45) Date of Patent: *Jun. 19, 2018

(54) SYSTEM AND METHOD FOR CONFIGURING PLURAL SOFTWARE PROFILES

(71) Applicants: SONY CORPORATION, Tokyo (JP); SONY ELECTRONICS INC., Park Ridge, NJ (US)

(72) Inventors: Adrian Crisan, San Diego, CA (US); Fredrik Carpio, Murrieta, CA (US)

(73) Assignees: SONY ELECTRONICS INC., Park Ridge, NJ (US); SONY CORPORATION, Tokyo (JP)

(*) Notice: Subject to any disclaimer, the term of this patent is extended or adjusted under 35 U.S.C. 154(b) by 449 days.

This patent is subject to a terminal disclaimer.

(21) Appl. No.: 14/086,258

(22) Filed: Nov. 21, 2013

(65) Prior Publication Data

US 2014/0129823 A1 May 8, 2014

Related U.S. Application Data

(63) Continuation of application No. 13/214,600, filed on Aug. 22, 2011, now Pat. No. 8,612,741, which is a continuation of application No. 12/368,386, filed on Feb. 10, 2009, now Pat. No. 8,131,991.

(51) Int. Cl.
| | | |
|---|---|---|
| G06F 9/00 | (2006.01) |
| G06F 9/445 | (2018.01) |
| G06F 1/32 | (2006.01) |
| G06F 9/44 | (2018.01) |

(52) U.S. Cl.
CPC ........ G06F 9/44505 (2013.01); G06F 1/3203 (2013.01); G06F 9/4401 (2013.01)

(58) Field of Classification Search
CPC .................................................. G06F 9/44505
USPC ......................................................... 713/100
See application file for complete search history.

(56) References Cited

U.S. PATENT DOCUMENTS

| | | | | |
|---|---|---|---|---|
| 7,797,753 | B2* | 9/2010 | Chamberlin | G06F 3/0482 726/21 |
| 8,000,736 | B2* | 8/2011 | Forstall | G06F 9/4451 455/550.1 |
| 8,131,991 | B2* | 3/2012 | Crisan | G06F 1/3203 713/100 |
| 8,612,741 | B2* | 12/2013 | Crisan | G06F 1/3203 713/100 |
| 2005/0070339 | A1* | 3/2005 | Kim | H04W 52/0258 455/572 |
| 2005/0149545 | A1* | 7/2005 | Zenz | G06Q 10/06 |
| 2005/0221844 | A1* | 10/2005 | Trethewey | H04M 1/72572 455/456.6 |
| 2005/0265531 | A1* | 12/2005 | Mika | H04M 1/72563 379/201.01 |

(Continued)

FOREIGN PATENT DOCUMENTS

| | | |
|---|---|---|
| TW | I302244 B | 10/2008 |

*Primary Examiner* — Vincent Tran
(74) *Attorney, Agent, or Firm* — Chip Law Group

(57) ABSTRACT

A computer with multiple software applications has defined for it plural software profiles for selection of one of the profiles in response to a system and/or user signal. Each profile when selected enables a respective set of applications to run on the system.

16 Claims, 2 Drawing Sheets

(56) References Cited

U.S. PATENT DOCUMENTS

| | | | |
|---|---|---|---|
| 2006/0059469 A1* | 3/2006 | Schumacher | G06F 21/51 717/127 |
| 2008/0224995 A1* | 9/2008 | Perkunder | G06F 3/0362 345/157 |
| 2009/0128843 A1* | 5/2009 | Lao | G06F 3/1205 358/1.15 |
| 2010/0115259 A1* | 5/2010 | Elsila | G06F 1/3203 713/100 |

* cited by examiner

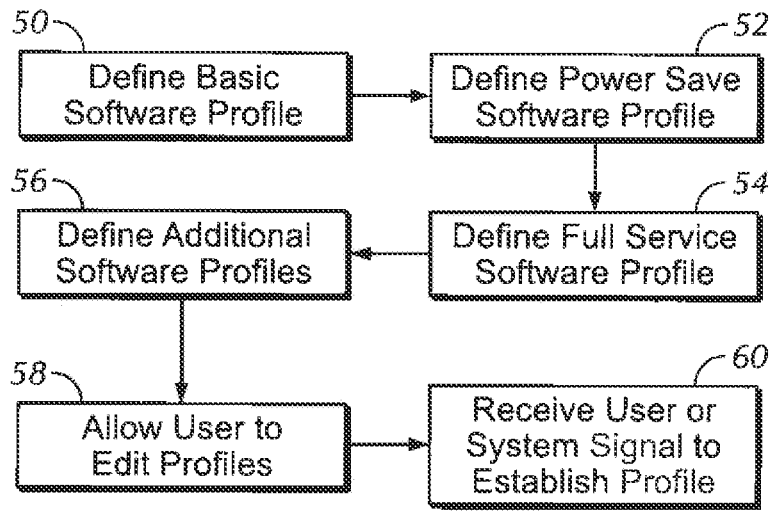
FIG. 2
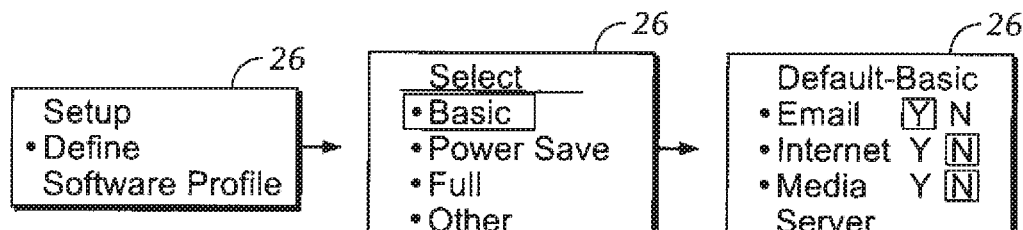
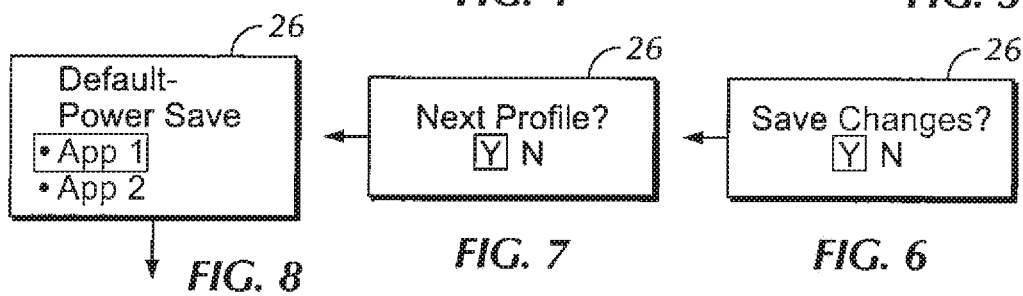
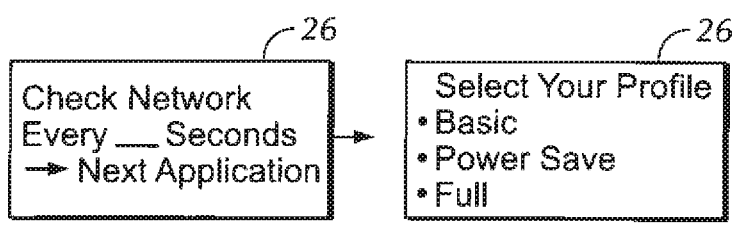

SYSTEM AND METHOD FOR CONFIGURING PLURAL SOFTWARE PROFILES

CROSS-REFERENCE TO RELATED APPLICATIONS

The present application is a continuation application of U.S. patent application Ser. No. 13/214,600 filed Aug. 22, 2011, which is a continuation of U.S. patent application Ser. No. 12/368,386 filed Feb. 10, 2009, now U.S. Pat. No. 8,131,991, the entire contents of each of which are incorporated herein by reference.

FIELD OF THE INVENTION

The present invention relates generally to systems and methods for configuring software profiles.

BACKGROUND OF THE INVENTION

When a personal computer is turned on, a basic input-output system (BIOS) that is stored in non-volatile solid state memory of the computer is invoked to begin what is known as a "boot" process, in which various initialization chores are undertaken. Among the most important of these chores is the copying of an operating system from disk storage of the computer over into typically a volatile solid state memory, such as DRAM, of the computer, for execution of the operating system by the processor of the computer when the computer is being used.

Performance and power management of computers typically are considered only from a hardware perspective. For example, a hardware switch might be provided that changes graphics controllers, etc. to improve performance or improve battery length. However, all software that needs to run usually starts from the time the system boots, and users cannot change software modes based on needs. Software-implemented services that execute but that do not perform any function until they are needed rob the system of performance and battery power.

SUMMARY OF THE INVENTION

Accordingly, as recognized herein there is no reason for certain software-implemented services such as, e.g., media services to run on the system all of the time. Turning such services off, however, requires the user to know the name of the service and how to turn it off, complicating user management of the software.

A system includes processor, one or more input devices useful by a person to input signals to the processor, and one or more tangible computer-readable storage medium accessible to the processor. Also, a display communicates with the processor to output signals from the processor. The computer storage medium contains plural software applications and plural software profile definitions for selection of one of the profile definitions in response to a system and/or user signal. Each profile, when selected, enables a respective set of applications to run on the system, with the set of applications in each profile being different than the set of applications in other profiles. One of the profiles can be a power save profile for which a user establishes how frequently at least one application in the respective set of applications checks for a network connection.

A software profile can be established in the computer in response to a user select signal. In some embodiments a user is permitted to edit only some, but not all, of the software profiles. For example, the user may not be permitted to edit a full software profile in which all available applications are permitted to run on the processor.

In example embodiments the processor presents on the display screen shots enabling a user to define and select software profiles, a first screen shot listing names of software profiles available for editing. In response to selection of a software profile for editing, a second screen shot can be presented listing names of applications that can be enabled to run for that profile. A user is permitted to change whether an application can run using the second screen shot. If desired, a user may be permitted to define which types of media are excluded from being served by a media service when the power save software profile is established.

In another aspect, a system includes processor, one or more input devices useful by a person to input signals to the processor, and one or more tangible computer-readable storage medium accessible to the processor. Also, a display communicates with the processor to output signals from the processor. The computer storage medium contains plural software applications and plural software profile definitions for selection of one of the profile definitions in response to a system and/or user signal. Each profile, when selected, enables a respective set of applications to run on the system, with the set of applications in each profile being different than the set of applications in other profiles. One of the profiles can be a power save profile in which a user establishes which types of media are excluded from being served by a media service when the power save software profile is established.

In another aspect, a system includes processor, one or more input devices useful by a person to input signals to the processor, and one or more tangible computer-readable storage medium accessible to the processor. Also, a display communicates with the processor to output signals from the processor. The computer storage medium contains plural software applications and plural software profile definitions for selection of one of the profile definitions in response to a system and/or user signal. Each profile, when selected, enables a respective set of applications to run on the system, with the set of applications in each profile being different than the set of applications in other profiles. A user is permitted to edit only some, but not all, of the software profiles.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart of a non-limiting implementation of logic for establishing software profiles; and FIGS. 3-10 are example non-limiting embodiments of screen shots that may be used to permit a user to modify/define software profiles.

DETAILED DESCRIPTION OF THE PREFERRED EMBODIMENT

Figure 1:
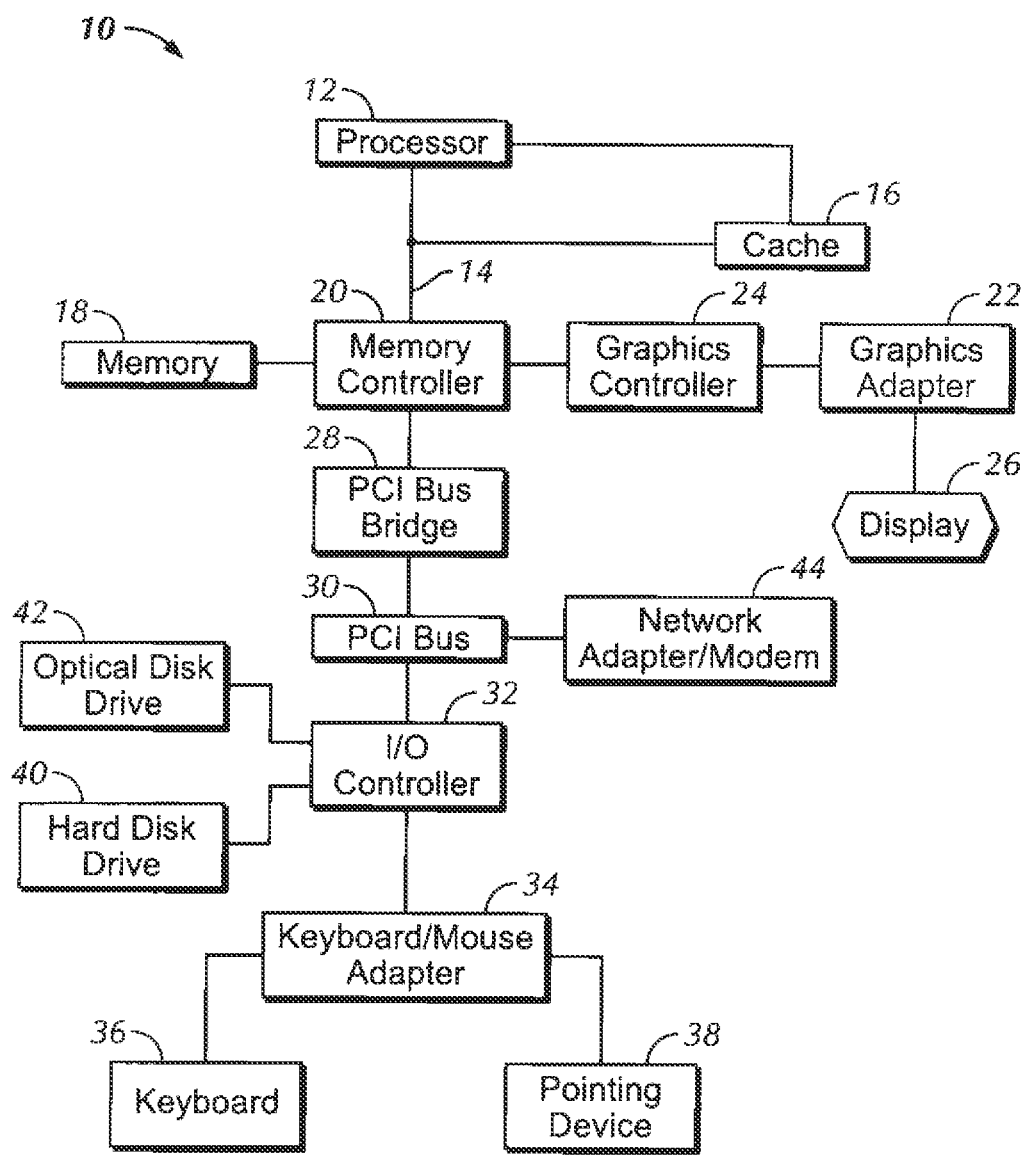
FIG. 1 is a block diagram of a non-limiting computer that can use the present invention.

Referring initially to FIG. 1, a high-level block diagram of a data processing system, generally designated 10, is shown in which the present invention may be implemented. The system 10 in one non-limiting embodiment is a personal computer or laptop computer. The system 10 includes a processor 12. The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. The cache 16 may include volatile memory such as DRAM and the memory 18 may include non-volatile memory such as flash memory. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program that may be stored in the memory 18, to load an operating system in the hard disk drive 40 into the memory 18. Software implementing various services and applications (sometimes referred to collectively herein as "applications") can be stored on one or more of the memory devices above.

Now referring to FIG. 2, the present logic can be seen in non-limiting flow chart format, it being understood that the actual logic may be implemented in state form or other suitable form. Commencing at block 50, a first software profile is defined, e.g., a "basic" profile that is automatically established in the computer pursuant to system boot. A default basic profile may be defined by the manufacturer of the computer. Or, the end purchaser of the computer may be permitted to define one or more software profiles from scratch. A combination of the two may be used, i.e., an end user may be permitted to modify a default profile that is initially defined by the manufacturer.

In non-limiting one example embodiment, the basic profile may include automatically starting an email program but preventing the starting of an Internet application and a media service, such as a direct local area network (dLAN).

Blocks 52-56 indicate that additional software profiles can be defined. For example, block 52 indicates that a power save software profile may be established. Details of the power save program are described further below, and may include the allowance of the operation of certain software applications and the prevention of the operation of other software, as well as defining certain power save behavior of software including how frequently a program will check for a network connection.

Block 54 indicates that a "full" software profile may be defined. In one implementation the "full" software profile may cause all available software applications and services to run on the computer. Additional profiles may be defined at block 56.

As mentioned above and as more fully explained below, at block 58 the end user may be permitted to edit the software profiles. In some embodiments, the end user may be permitted to edit only some, but not all, of the profiles. For example, the end user may not be permitted to edit the "full" profile. At block 60, a system signal (such as a boot signal to establish the basic software profile) or a user-generated signal (such as the profile selection described below) is received and used to establish in the computer one of the software profiles.

FIGS. 3-10 show screen shots that may be presented on, e.g., the monitor 26 shown in FIG. 1. FIG. 3 simply shows an example set up screen that includes an entry selectable by an end user using, e.g., the keyboard 36/pointing device 38 shown in FIG. 1 to enter a "define software profile" mode. In response, the screen of FIG. 4 may appear listing the names of the software profiles available for editing. In the example shown, "basic", "power save", and "full" are shown for selection, with the box around "basic" indicating for illustration that the end user has selected to edit the "basic" software profile. Additional profiles may also be listed.

When default profiles have been defined by the manufacturer, the screen of FIG. 5 may appear listing, for the selected software profile, the applications/services that are enabled to run for that profile. In the example shown, the email application is shown to be enabled in the "basic" software profile but not an Internet browser or a media server application. This may be changed by the user clicking on "Y" for a non-enabled program to enable it, and "N" on a an enabled program to disable it.

When the user is done editing a profile the screen of FIG. 6 may appear, prompting the user to indicate whether he is done and wishes for changes to the profile definition to be saved. In the example shown, the user has indicated that he wishes to save the changes. After saving (or not) the changes, the screen of FIG. 7 may appear, asking the user if he wishes to proceed to edit the next profile. In the example shown, the user has indicated "yes" and so the next profile in the list, in this example, "power save" software profile, appears on the screen of example FIG. 8.

As shown, the power save profile screen shot may list the applications/services that are permitted to run in the power save software profile. Additionally, the user may be given the opportunity to define certain power save behavior of each application listed as being enabled in the power save software profile. For example, if the user selects "application 1" to be enabled in the power save profile, the screen of FIG. 9 may appear, prompting the user to enter the frequency (in the example shown, in seconds) with which the selected application will check for network connectivity. Other power save behavior may be implemented, e.g., in the case of a media service, which types of media might be excluded from being served when the power save software profile is established.

Once the software profiles have been defined and/or edited, the screen of FIG. 10 may appear. The screen of FIG. 10 lists the available software profiles for selection of one of them by the user for immediate establishment of that profile in the computer.

In some embodiments all software services are stopped are started only when an application needs them.

While the particular SYSTEM AND METHOD FOR CONFIGURING PLURAL SOFTWARE PROFILES is herein shown and described in detail, it is to be understood that the subject matter which is encompassed by the present invention is limited only by the claims.

What is claimed is:

1. A system, comprising:
one or more processors configured to:
control a display screen to display a plurality of software profiles that comprises a first software profile, a second software profile, and a non-editable software profile,
wherein said first software profile is editable based on a first system signal,
wherein said first software profile corresponds to a first set of software applications,
wherein said second software profile is editable based on a second system signal,
wherein said second software profile corresponds to a second set of software applications,
wherein said first set of software applications is different from said second set of software applications, and
wherein a user is prohibited to edit said non-editable software profile that comprises a plurality of software applications that are available to run on said system;
run each of said plurality of software applications included in said non-editable software profile on said system based on a first selection of said non-editable software profile from said plurality of software profiles; and
enable said first set of software applications corresponding to said first software profile to run on said system based on a second selection of said first software profile,
wherein said first set of software applications is user-selectable.

2. The system of claim 1, wherein, based on said second selection, said one or more processors are further configured to enable said first set of software applications defined for said first software profile to run on said system.

3. The system of claim 1, wherein said first set of software applications comprises at least a software application configured to check for a network connection at time intervals.

4. The system of claim 1, wherein said first set of software applications comprises at least a software application configured to automatically start an email program and prevent a media service from being started.

5. The system of claim 4, wherein said user is permitted to define types of media that are served by said media service.

6. The system of claim 4, wherein said one or more processors are further configured to, based on a third selection of one of said first set of software applications on a user-interface (UI), generate an additional screen that includes at least one UI element that is configured to enable or disable a respective software application of said first set of software applications.

7. The system of claim 1, wherein said one or more processors are further configured to control said display screen to further display a first screen, wherein said first screen displays first names of said plurality of software profiles.

8. The system of claim 7, wherein, based on said second selection of said first software profile of said plurality of software profiles from said first names, said one or more processors are further configured to control said display screen to further display a second screen that lists second names of said first set of software applications defined for said first software profile, and
wherein based on said second screen, said user is permitted to manage said first set of software applications defined for said first software profile.

9. The system of claim 1, wherein said one or more processors are further configured to:
generate a selection screen to select said second software profile of said plurality of software profiles after an edit of said first software profile.

10. A method, comprising:
in a computing device:
controlling a display screen to display a plurality of software profiles that comprises a first software profile, a second software profile, and a non-editable software profile,
wherein said first software profile is editable based on a first system signal,
wherein said first software profile corresponds to a first set of software applications,
wherein said second software profile is editable based on a second system signal,
wherein said second software profile corresponds to a second set of software applications,
wherein said first set of software applications is different from said second set of software applications, and
wherein a user is prohibited to edit said non-editable software profile that comprises a plurality of software applications that are available to run on said system;
running each of said plurality of software applications included in said non-editable software profile on said computing device based on a first selection of said non-editable software profile from said plurality of software profiles; and
enabling said first set of software applications corresponding to said first software profile to run on said computing device based on a second selection of said first software profile, wherein said set of software applications is user-selectable.

11. The method of claim 10, wherein said first set of software applications comprises at least a software application configured to check for a network connection at time intervals.

12. The method of claim 10, wherein said first set of software applications comprises at least a software application for automatically starting an email program and preventing starting of a media service.

13. The method of claim 12, wherein said user is permitted to define types of media that are served by said media service.

14. The method of claim 10, further comprising controlling said display screen to display a first screen, wherein said first screen displays first names of said plurality of software profiles.

15. The method of claim 14, wherein based on said second selection of said first software profile of said plurality of software profiles for editing from said first names, controlling said display screen to display a second screen listing second names of said first set of software applications defined for said first software profile, and
wherein based on said second screen, said user is permitted to manage said first set of software applications defined for said first software profile.

16. A non-transitory computer-readable having stored thereon, computer-executable instructions, which when executed by a computer, cause said computer to execute operations, said operations comprising:

in a computing device:
controlling a display screen to display a plurality of software profiles that comprises a first software profile, a second software profile, and a non-editable software profile,
  wherein said first software profile is editable based on a first system signal,
  wherein said first software profile corresponds to a first set of software applications,
  wherein said second software profile is editable based on a second system signal,
  wherein said second software profile corresponds to a second set of software applications,
  wherein said first set of software applications is different from said second set of software applications, and
  wherein a user is prohibited to edit said non-editable software profile that comprising a plurality of software applications that are available to run on said system;
running each of said plurality of software applications included in said non-editable software profile on said computing device based on a first selection of said non-editable software profile from said plurality of software profiles; and
enabling said first set of software applications corresponding to said first software profile to run on said computing device based on a second selection of said first software profile, wherein said set of software applications is user-selectable.

* * * * *